(12) United States Patent
Narasipuram (10) Patent No.: US 11,240,571 B2
(45) Date of Patent: Feb. 1, 2022

(54) METHOD AND SYSTEM FOR ENABLING INTERACTIVE INFOMERCIALS

(71) Applicant: ABDA Digital Private Limited, Hyderabad (IN)

(72) Inventor: Sravan Kumar Narasipuram, Hyderabad (IN)

(73) Assignee: ABDA Digital Private Limited, Hyderabad (IN)

( * ) Notice: Subject to any disclaimer, the term of this patent is extended or adjusted under 35 U.S.C. 154(b) by 0 days.

(21) Appl. No.: 15/990,359

(22) Filed: May 25, 2018

(65) Prior Publication Data

US 2019/0191227 A1 Jun. 20, 2019

Related U.S. Application Data

(63) Continuation-in-part of application No. 15/220,745, filed on Jul. 27, 2016, now Pat. No. 10,015,565.

(30) Foreign Application Priority Data

Jul. 27, 2015 (IN) .......................... 3830/CHE/2015

(51) Int. Cl.
*H04N 21/25* (2011.01)
*H04N 21/258* (2011.01)
(Continued)

(52) U.S. Cl.
CPC ......... *H04N 21/8586* (2013.01); *G06Q 30/00* (2013.01); *H04N 21/252* (2013.01);
(Continued)

(58) Field of Classification Search
CPC .......................... H04N 21/8586; H04N 21/812
See application file for complete search history.

(56) References Cited

U.S. PATENT DOCUMENTS 7,403,968 B2 * 7/2008 Lee .......................... H04N 7/163
375/E7.024
8,510,661 B2 8/2013 Dharmaji et al.
(Continued)

OTHER PUBLICATIONS

First Examination Report for Indian Patent Application No. 3830/CHE/2015, dated Jul. 20, 2018, 6 pages.

*Primary Examiner* — Hsiungfei Peng
(74) *Attorney, Agent, or Firm* — Rudy J. Ng; Bret E. Field; Bozicevic, Field & Francis LLP (57) ABSTRACT

Embodiments of present disclosure relates to a method and an interactive infomercial system for enabling interactive infomercials. In one embodiment, the system receives a request for U3I (unique infomercial identification information) associated with infomercial content. The system determines the availability of pregenerated U3I and generate remaining number of U3I based on determination of non-availability of the requested U3I. Further, the system updates the generated U3I with at least one redirect URL that is activated to enable the rendering of the infomercial content on a user device. The system may also generate personalized U3Is based on user data. Thus, the above disclosed system and method enables real-time interactive infomercials to the users such that the U3Is are generated and stored in advance when the system is available and updated with animation content on demand in less time and quick response time.

15 Claims, 4 Drawing Sheets

(51) Int. Cl.
*H04N 21/81* (2011.01)
*H04N 21/8545* (2011.01)
*H04N 21/858* (2011.01)
*G06Q 30/00* (2012.01)

(52) U.S. Cl.
CPC ......... *H04N 21/258* (2013.01); *H04N 21/812* (2013.01); *H04N 21/8545* (2013.01)

(56) References Cited

U.S. PATENT DOCUMENTS

| | | |
|---|---|---|
| 8,712,450 B2 | 4/2014 | Dennard et al. |
| 9,887,970 B2 * | 2/2018 | Luff .................... G06F 21/6209 |
| 2006/0095526 A1 * | 5/2006 | Levergood ............. G06Q 20/10 |
| | | 709/206 |
| 2012/0166561 A1 | 6/2012 | Kelly |
| 2014/0019253 A1 | 1/2014 | Ricasata |
| 2014/0156702 A1 * | 6/2014 | Shyamsunder ....... G06F 16/245 |
| | | 707/769 |
| 2016/0205442 A1 | 7/2016 | Yee et al. |

* cited by examiner

METHOD AND SYSTEM FOR ENABLING INTERACTIVE INFOMERCIALS

CROSS REFERENCE TO RELATED APPLICATIONS

This application is a continuation-in-part application of U.S. application Ser. No. 15/220,745, filed Jul. 27, 2016, issued, which claims the benefit of and priority to Indian Application No. 3830/CHE/2015, filed Jul. 27, 2015, the entire contents of which are incorporated herein by reference.

FIELD OF THE DISCLOSURE

The present subject matter is related, in general to interactive infomercials, and more particularly, but not exclusively to a method and a system for enabling interactive infomercials on mobile devices of users.

BACKGROUND

Infomercials are typically distributed to mobile viewing devices i.e. wireless mobile devices using multicasting based on user preferences. As a result, the same infomercial content may be received by multiple mobile users. Infomercials include advertisements, tutorials, online technical manuals, and so on. Typically, infomercials are transmitted to users over mobile messaging services such as short message service (SMS), instant messaging (IM) service or the like. The infomercials may be built to run on a mobile data service to provide real-time information or lead requests to the users and also enables screening of responders to the lead request. However, generating the infomercials involve huge time and memory and requires large data bandwidth for generation.

SUMMARY

One or more shortcomings of the prior art are overcome and additional advantages are provided through the present disclosure. Additional features and advantages are realized through the techniques of the present disclosure. Other embodiments and aspects of the disclosure are described in detail herein and are considered a part of the claimed disclosure.

Accordingly, the present disclosure relates to a method of enabling interactive infomercials. The method comprises step of receiving a request for at least one unique infomercial identification information (U3I) of infomercial content comprising at least one unique Uniform Resource Locator (URL). The method further comprises determining availability of the at least one U3I in a U3I repository coupled with the IIS. Based on the determining, the method comprises generating the requested U3I comprising the at least one unique URL without corresponding at least one redirect URL, wherein the at least one redirect URLs is different from the at least one unique URL. The method further comprising creating the at least one redirect URL comprising the infomercial content for the requested U3I.

Further, the present disclosure relates to a system for enabling interactive infomercials. The system comprises a processor, a data repository comprising unique infomercial identification information (U3I) repository and a content repository, coupled with the processor. The system further comprises one or more user device associated with user, coupled with the processor and a memory communicatively coupled with the processor. The memory stores processor-executable instructions, which, on execution, cause the processor to receive a request for at least one unique infomercial identification information (U3I) of infomercial content comprising at least one unique Uniform Resource Locator (URL). Further, the processor is configured to determine availability of the at least one U3I in the U3I repository and upon determining, generate the requested U3I comprising the at least one unique URL without corresponding at least one redirect URL, wherein the at least one redirect URL is different from the at least one unique URL. Furthermore, the processor is configured to create the at least one redirect URL comprising the infomercial content for the requested U3I.

Furthermore, the present disclosure relates to a non-transitory computer readable medium including instructions stored thereon that when processed by at least one processor cause a system to receive a request for at least one unique infomercial identification information (U3I) of infomercial content comprising at least one unique Uniform Resource Locator (URL). Further, the instructions cause the processor to determine availability of the at least one U3I in a U3I repository coupled with the IIS and generate the requested U3I comprising the at least one unique URL without corresponding at least one redirect URL upon determining, wherein the at least one redirect URL is different from the at least one unique URL. Furthermore, the instructions cause the processor to create the at least one redirect URL comprising the infomercial content for the requested U3I.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed embodiments. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

The present disclosure relates to a method and an interactive infomercial system for enabling interactive infomercials. In one embodiment, the system receives a request for U3I (unique infomercial identification information) associated with infomercial content. The system determines the availability of pregenerated U3I and generate remaining number of U3I based on determination of non-availability of the requested U3I. Further, the system updates the generated U3I with at least one redirect URL that is activated to enable the rendering of the infomercial content on a user device. Thus, the above disclosed system and method enables real-time interactive infomercials to the users such that the U3Is are generated and stored in advance when the system is available and updated with animation content on demand in less time and quick response time.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1:
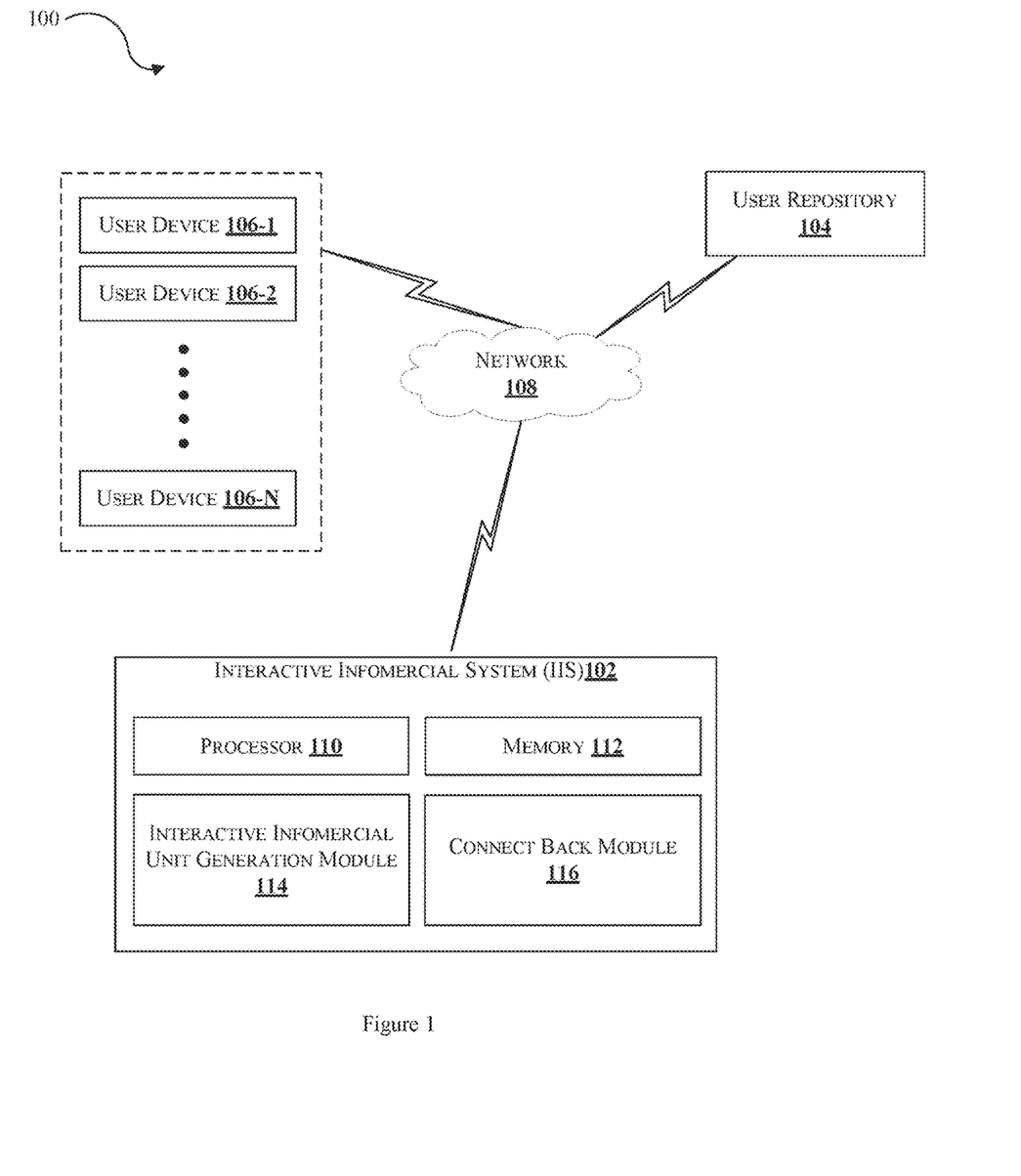
FIG. 1 illustrates an architecture diagram of an exemplary system for enabling interactive infomercials in accordance with some embodiments of the present disclosure.

FIG. 1 illustrates an architecture diagram of an exemplary system for enabling interactive infomercials in accordance with some embodiments of the present disclosure.

As shown in FIG. 1, the exemplary system 100 comprises one or more components configured for enabling interactive infomercials. The system 100 can be implemented as a networked client-server communication system. In one embodiment, the exemplary system 100 comprises an interactive infomercial system (hereinafter referred to as ITS) 102, a third-party server 103, a data repository 104 and one or more mobile viewing user devices 106-1, 106-2, . . . 106-N (collectively referred to as user devices 106) connected via a communication network 108. Each of these devices may communicate with each other via one or more communication channels or communication network 108. The communication network 108 may be such as the Internet, cable, satellite, local area network (LAN), wide area networks (WAN), telephone networks or the like. Any of the devices described herein may be directly connected to each other and/or connected over the communication network 108.

The IIS 102 may provide one or more functions or services to a number of user devices 106. In one embodiment, the IIS 102 may be a computing device having a large storing capacity, with one or more microprocessors and high-speed network connections. In one example, the IIS 102 may be a web application and the components of the IIS 102 may support the construction of web pages via web browser. The data repository 104 and the IIS 102 are illustrated as separate devices, however in one embodiment, the data repository 104 may be combined or integrated within the IIS 102. The data repository 104 stores information in one or more databases requested from the IIS 102 through a front-end running on the user device 106. In one example, the data repository comprises a U3I repository 105-1 and a content repository 105-2. The U3I repository 105-1 comprises at least one unique infomercial identification information (U3I) previously generated and stored in the U3I repository 105-1. Each U3I is associated with the infomercial content and comprises, in one example, at least one unique Uniform Resource Locator (URL) that when activated enable the user device 106 to view rendering of the infomercial content. Each URL comprises at least one domain name of IIS 102 and a unique identifier of the at least one unique URL. The domain name is fixed, and the unique identifier that represents the information specific to an entity varies. The length of the at least one U3I is variable but never lesser than predetermined length. The U3I repository 105-1 may also store user data associated with one user receiving the at least one U3I. In one example, the user data comprising at least user profile information, user device identifier, user device location information, user device navigation information and user preferences. The user data may be provided via the user device 106 and stored in the U3I repository 105-1. The U3I repository 105-1 stores the user data that includes among others, user profile information such as personal details, and user preferences and/or interests of viewing the one or more interactive infomercial content on the user devices 106.

In another embodiment, the U3I repository 105-1 may also generate and store at least one U3I that may be personalized according to the sender of the U3I. In one example, the U3I may comprises at least one URL, and the unique identifier of the at least one URL may comprise for example, at least reserved bits and non-reserved bits. The reserved bits may comprise at least information of the sender of the requested U3I and the non-reserved bits comprises randomly generated characters. The length of position of the reserved bits is not fixed, but variable within the length of unique identifier of the at least one URL.

The content repository 105-2 comprises the infomercial content, may be for example, animated content comprising images, and programmable scripts. The content repository 105-2 is updated with the animation content by a third-party server 103 such as for example, Vodafone web server. The infomercial content may be related to different region, language, industry and other related events. The interactive infomercial content may be one or more animation sections that are independently downloadable and played in a series or in any predefined manner without any time delay. The animation content is downloaded and played on a user defined interface on the user devices 106. The animation content may be animated infomercials for special occasions like birthdays, wedding anniversaries and other occasions associated to the users. In another example, the animation content may be animated advertisements of a particular product owned by a brand entity. In yet another example, the animation content may be animated manual instructions capable of providing information of a particular action or task such as fixing any product or handling maintenance and repair of a product or trouble shooting processes.

The content repository 105-2 may create one or more directories for storing infomercial content of different categories and in different languages. The U3I repository 105-1 and the content repository 105-2 may be configured independently instead of being integrated within the data repository 104.

Figure 2:
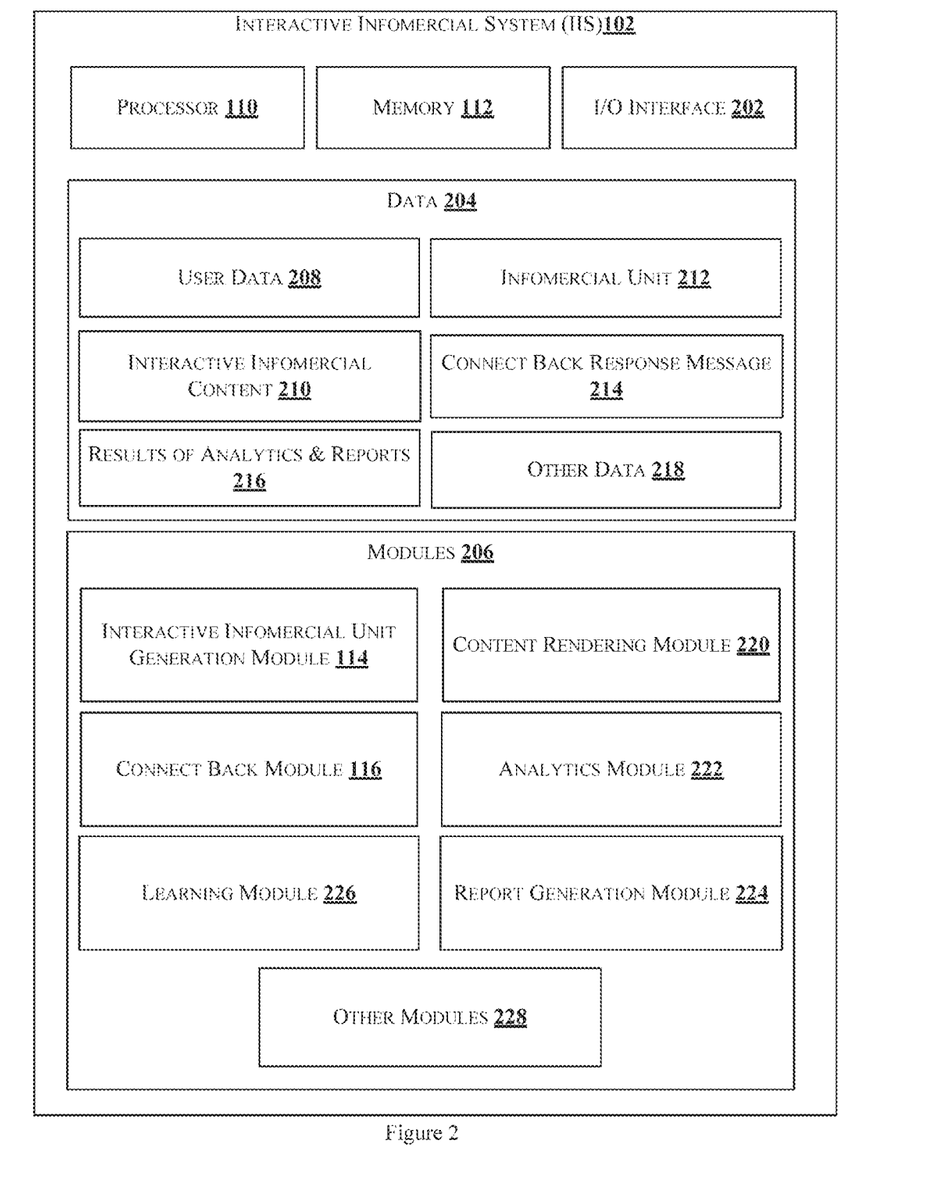
FIG. 2 illustrates an exemplary block diagram of an interactive infomercial system (IIS) of FIG. 1 in accordance with some embodiments of the present disclosure.

In one embodiment, the IIS 102 comprises at least a processor 110 and a memory 112 coupled with the processor 110. The IIS 102 further comprises a U3I generation module 114 and a U3I personalization module 116 coupled with the processor 110. The IIS 102 may be a typical IIS as illustrated in FIG. 2. The IIS 102 comprises the processor 110, the memory 112, and an I/O interface 202. The I/O interface 202 is coupled with the processor 110 and an I/O device. The I/O device is configured to receive inputs via the I/O interface 202 and transmit outputs for displaying in the I/O device via the I/O interface 202.

The IIS 102 further comprises data 204 and modules 206. In one implementation, the data 204 and the modules 206 may be stored within the memory 112. In one example, the data 204 may include user data 208, infomercial content 210, U3I 212, and redirect URLs 214 and other data 218. In one embodiment, the data 204 may be stored in the memory 112 in the form of various data structures. Additionally, the aforementioned data can be organized using data models, such as relational or hierarchical data models. The other data 218 may be also referred to as reference repository for storing recommended implementation approaches as reference data. The other data 218 may also store data, including temporary data and temporary files, generated by the modules 206 for performing the various functions of the IIS 102.

The modules 206 may include, for example, the U3I generation module 114, the U3I personalization module 116, and an U3I updation module 220. The modules 206 may also comprise other modules 222 to perform various miscellaneous functionalities of the IIS 102. It will be appreciated that such aforementioned modules may be represented as a single module or a combination of different modules. The modules 206 may be implemented in the form of software, hardware and/or firmware.

In operation, the IIS 102 enables rendering of interactive infomercials on the user device 106. In one embodiment, the IIS 102 may be a dedicated system interacting with user devices 106 and the data repository 104. The IIS 102 receives a request for the at least one U3I 212 from a sender and generates the at least one U3I 212 in response to the request. In one implementation, the U3I generation module 114 of the IIS 102 receives the request for the at least one U3I 212 and determines the count of requested U3Is to be generated. If the U3I generation module 114 determines that the requested number of U3I is not available in the U3I repository 105-1, then the U3I generation module 114 generates the remaining number of U3Is when the IIS 102 is available for U3I generation. In one example, the U3I generation module 114 may determine one or more system parameters like processor utilization, memory usage, memory capacity, idle time and so on. Based on the one or more system parameters, the U3I generation module 114 schedules the generation of the remaining U3Is. The U3I generation module 114 generates the at least one requested U3I 212 comprising the at least one unique URLs without generating corresponding at least one redirect URL 214.

If the U3I generation module 114 determines that the requested number of U3I 212 is available in the U3I repository 105-1, the U3I generation module 114 retrieves the requested U3Is 212 pregenerated and stored in the U3I repository 105-1. Upon retrieving the requested U3Is 212, the U3I updation module 220 creates at least one redirect URL 214 and performs mapping of the requested U3I 212 with the at least one redirect URL 214. In one implementation, the U3I updation module 220 creates the at least one redirect URL 214 and retrieves the infomercial content 210 from the content repository 105-2 to which the at least one redirect URL 214 must return in response to activation of the at least one redirect URL 214. Further, the U3I updation module 220 performs mapping of the at least one unique URL of the requested U3I 212 with the at least one redirect URL 214 with the infomercial content 210 retrieved from the content repository 105-2.

In another embodiment, the U3I generation module 114 generates at least one personalized or customized U3I in response to the request. If the U3I generation module 114 generates the at least one U3I 212 and the U3I personalization module 116 modifies the at least one unique URL of the at least one U3I 212. The at least one unique URL may comprise a randomly generated alphanumeric characters of predetermined size. In one implementation, the U3I personalization 212 modifies the unique identifier of the unique URL of the at least one U3I 212 by replacing the reserved bits of the unique identifier with customized bits such as brand names of an entity or organization.

In another embodiment, the U3I updation module 220 creates the at least one redirect URL 214 based on the user data 208 received in the request. The U3I personalization module 116 determines the user data 208 comprising the user device location, user preferences and interests, and selects the infomercial content 210 from the content repository 105-2 based on determination. The selected infomercial content 210 may also be further processed or edited to customize or personalized based on user preferences and/or interests for better acceptance by the users. Upon selection, the U3I updation module 220 updates the at least one redirect URL 214 for the selected infomercial content and performs mapping of the at least one redirect URL 214 with the at least one U3I thus generated. Upon mapping, the U3I generation module 114 transmits the at least one requested U3I 212 comprising the at least one unique URL to the sender of the request.

In yet another embodiment, the U3I generation module 114 generate password protected U3Is 212 comprising at least one password encrypted within the at least one U3I 212. The user may need to provide the at least one password via the user interface to enable the rendering of the infomercial content 212 of the at least one U3I 212. In one example, the user may receive the at least one password like One Time Password (OTP) on the user devices 106 from the IIS 102.

The user devices 106 receives the infomercial unit 212 from the IIS 102 and downloads the interactive infomercial content 210 i.e. the animation content on the user devices 106. In one embodiment, the user devices 106 comprises a pre-defined user interface for rendering the interactive infomercial content 210. In one example, the pre-defined user interface may be a typical web browser that downloads and plays the animation content.

Thus, the above disclosed system and method enables real-time interactive infomercials to the users such that the U3Is are generated and stored in advance when the system is available and updated with animation content on demand in less time and quick response time.

Figure 3:
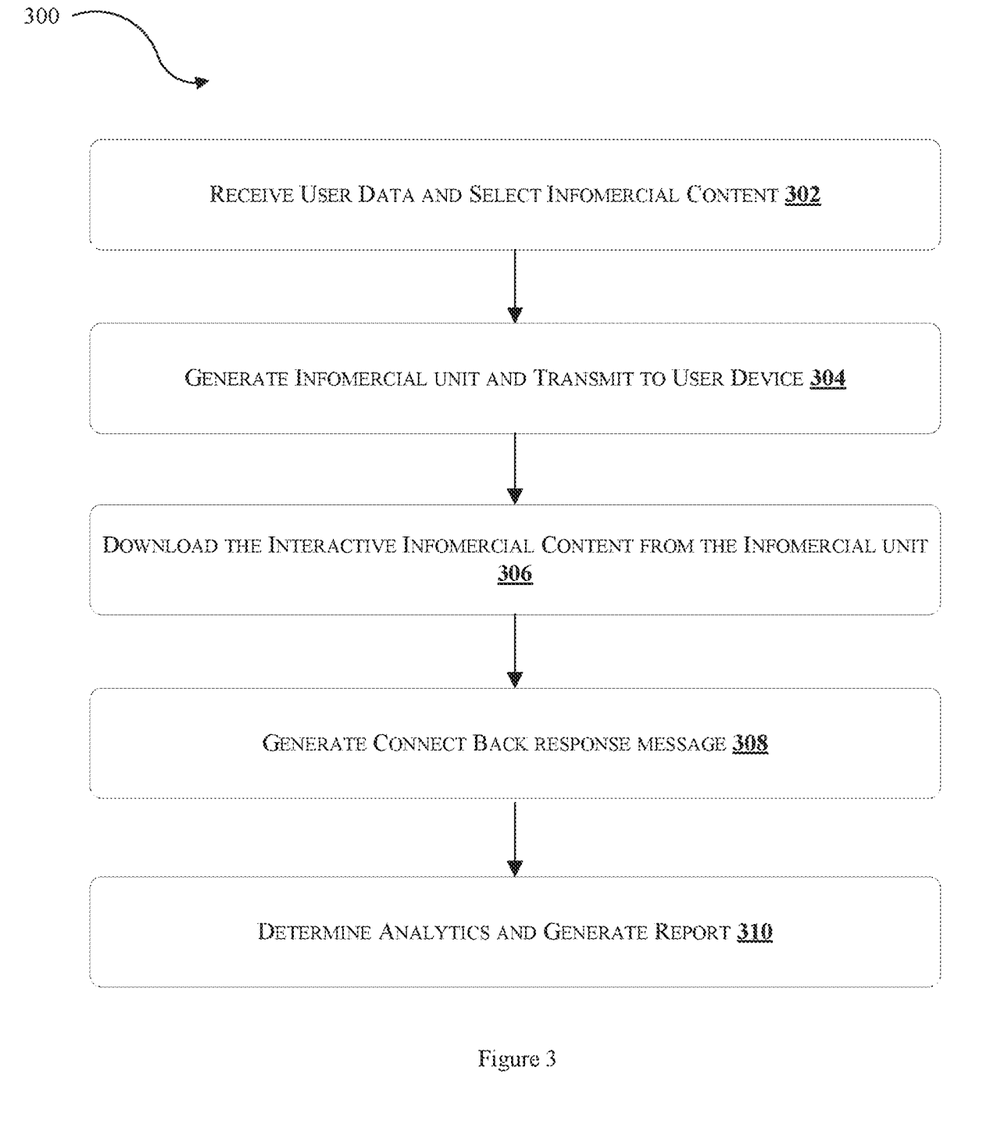
FIG. 3 illustrates a flowchart of an exemplary method of enabling interactive infomercials in accordance with some embodiments of the present disclosure.

FIG. 3 illustrates a flowchart of a method of enabling interactive infomercials in accordance with some embodiments of the present disclosure.

As illustrated in FIG. 3, the method 300 comprises one or more blocks implemented by the processor 110 for enabling interactive infomercials on user devices 106. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method 300. Additionally, individual blocks may be deleted from the method 300 without departing from the spirit and scope of the subject matter described herein. Furthermore, the method 300 can be implemented in any suitable hardware, software, firmware, or combination thereof.

At block 302, U3I generation module receives the request for U3I. In one embodiment, the U3I generation module 114 of the IIS 102 receives the request for the at least one U3I 212.

At block 304, the U3I generation module determines the availability of requested U3I. In one embodiment, the U3I generation module 114 determines the count of requested U3Is to be generated. The U3I generation module 114 determines the availability of the requested number of U3I in the U3I repository 105-1.

At block 306, the U3I generation module generates the requested U3I. In one embodiment, if the U3I generation module 114 determines that the requested number of U3I is not available in the U3I repository 105-1, then the U3I generation module 114 generates the remaining number of U3Is when the IIS 102 is available for U3I generation. If the U3I generation module 114 determines that the requested number of U3I 212 is available in the U3I repository 105-1, the U3I generation module 114 retrieves the requested U3Is 212 pregenerated and stored in the U3I repository 105-1.

At block 308, a U3I updation module creates redirect URLs for the requested U3I. Upon retrieving the requested U3Is 212, the U3I updation module 220 creates at least one redirect URL 214 and performs mapping of the requested U3I 212 with the at least one redirect URL 214. In one implementation, the U3I updation module 220 creates the at least one redirect URL 214 and retrieves the infomercial content 210 from the content repository 105-2 to which the at least one redirect URL 214 must return in response to activation of the at least one redirect URL 214. Further, the U3I updation module 220 performs mapping of the at least one unique URL of the requested U3I 212 with the at least one redirect URL 214 with the infomercial content 210 retrieved from the content repository 105-2.

In another embodiment, the U3I generation module 114 generates at least one personalized or customized U3I in response to the request. If the U3I generation module generates the at least one U3I 212 and the U3I personalization module 116 modifies the at least one unique URL of the at least one U3I 212. The at least one unique URL may comprise a randomly generated alphanumeric characters of predetermined size. In one implementation, the U3I personalization 212 modifies the unique identifier of the unique URL of the at least one U3I 212 by replacing the reserved bits of the unique identifier with customized bits such as brand names of an entity or organization. If there are excess reserved bits upon replacement, the remaining reserved bits may be provided with alphanumeric characters along with brand names of the entity or organization to create unique identifier of the at least one U3I 212.

In another embodiment, the U3I updation module 220 creates the at least one redirect URL 214 based on the user data 208 received in the request. The U3I personalization module 116 determines the user data 208 comprising the user device location, user device identifier, user preferences and interests, and selects the infomercial content 210 from the content repository 105-2 based on determination. In one example, the U3I personalization module 116 determines the user device identifier, for example Internet Protocol (IP) address, based on the request and further determines the user device location information, such as geolocation coordinates for estimating the exact area or region, and language of the region. Based on the estimation of the exact area or region where the user device is located, the U3I personalization module 116 selects the infomercial content 210 corresponding to the estimated area or region in respective language. If the U3I personalization module 116 determines that the infomercial content 210 corresponding to the estimated area or region in the respective language is not available, then the U3I personalization module 116 selects the infomercial content 210 that is indicated as default asset. The selected infomercial content 210 may also be further processed or edited to customize or personalized based on user preferences and/or interests for better acceptance by the users. Upon selection, the U3I updation module 220 updates the at least one redirect URL 214 for the selected infomercial content and performs mapping of the at least one redirect URL 214 with the at least one U3I thus generated. Upon mapping, the U3I generation module 114 transmits the at least one requested U3I 212 comprising the at least one unique URL to the sender of the request.

In yet another embodiment, the U3I generation module 114 generate password protected U3Is 212 comprising at least one password encrypted within the at least one U3I 212. The user may need to provide the at least one password via the user interface to enable the rendering of the infomercial content 212 of the at least one U3I 212. In still another embodiment, the U3I generation module 114 generate the at least one U3I 212 comprising the infomercial content 210 such as presentations or PDF documents that are available in predefined image formats. Furthermore, the U3I generation module 114 may generate the at least one U3I 212 comprising user data collection forms and surveys as infomercial content 210 that is activated in response to activation of the at least one U3I 212 thus generated.

The U3I updation module 220 may also determine lifetime or expiry of the at least one U3I 212 and deactivate the at least one U3I 212 based on determination. In one example, the U3I updation module 220 determines the lifetime or expiry of the at least one U3I 212 that may be previously defined by the U3I generation module 114. In one embodiment, the U3I generation module 114 may define the lifetime or expiry of the at least one U3I 212 based on occurrence of one or more events comprising first access of the at least one U3I 212, after submission of any data, after a particular date, period of time or even, after using for number of times, expire if the at least one U3I 212 is accessed after an authorized use, if the at least one U3I 212 is accessed after an unauthorized use of attempting one or more number of times and is not accessible before a particular date, period of time or event. On determination of the expiry, the U3I updation module 220 disables the at least one U3I 212 for further access.

The user devices 106 receives the infomercial content 210 from the IIS 102 and downloads the interactive infomercial content 210 i.e. the animation content on the user devices 106. In one embodiment, the user devices 106 comprises a pre-defined user interface for rendering the interactive infomercial content 210. In one example, the pre-defined user interface may be a typical web browser that downloads and plays the animation content. Thus, the above disclosed system and method enables real-time interactive infomercials to the users such that the U3Is are generated and stored in advance when the system is available and updated with animation content on demand in less time and quick response time.

Figure 4:
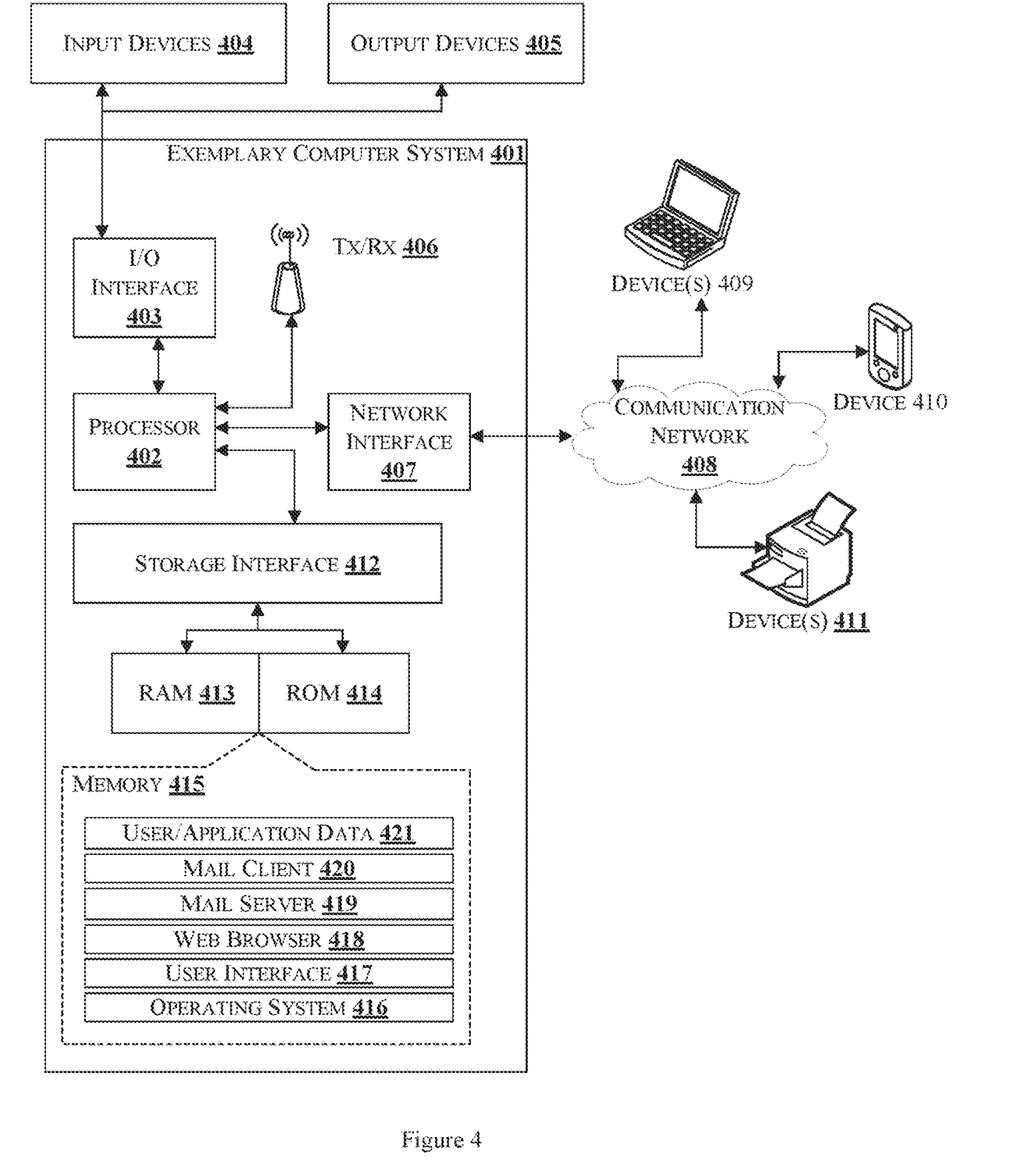
FIG. 4 illustrates a block diagram of an exemplary computer system for implementing embodiments consistent with the present disclosure.

FIG. 4 is a block diagram of an exemplary computer system for implementing embodiments consistent with the present disclosure.

Variations of computer system 401 may be used for implementing all the computing systems that may be utilized to implement the features of the present disclosure. Computer system 401 may comprise a central processing unit ("CPU" or "processor") 402. Processor 402 may comprise at least one data processor for executing program components for executing user- or system-generated requests. The processor may include specialized processing units such as integrated system (bus) controllers, memory management control units, floating point units, graphics processing units, digital signal processing units, etc. The processor 402 may include a microprocessor, such as AMD Athlon, Duron or Opteron, ARM's application, embedded or secure processors, IBM PowerPC, Intel's Core, Itanium, Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface 407 may employ connection protocols including, without limitation, direct connect, Ethernet (e.g., twisted pair 10/40/400 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 409, 410, and 411. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 401 may itself embody one or more of these devices.

In some embodiments, the processor 402 may be disposed in communication with one or more memory devices (e.g., RAM 413, ROM 14, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory 415 may store a collection of program or database components, including, without limitation, an operating system 16, user interface application 517, web browser 418, mail server 419, mail client 420, user/application data 421 (e.g., any data variables or data records discussed in this disclosure), etc. The operating system 416 may facilitate resource management and operation of the computer system 401. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 401 may implement a web browser 418 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 401 may implement a mail server 419 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client may be a mail viewing application, such as Apple Mail, Microsoft Entourage, Microsoft Outlook, Mozilla Thunderbird, etc.

In some embodiments, computer system 401 may store user/application data 421, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As described above, the modules 206 amongst other things, include routines, programs, objects, components, and data structures, which perform particular tasks or implement particular abstract data types. The modules 206 may also be implemented as, signal processor(s), state machine(s), logic circuitries, and/or any other device or component that manipulate signals based on operational instructions. Further, the modules 206 can be implemented by one or more hardware components, by computer-readable instructions executed by a processing unit, or by a combination thereof.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., are non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of enabling interactive infomercials, comprising:
    receiving, by a processor of an interactive infomercial system (IIS), a request for at least one unique infomercial identification information (U3I) of infomercial content comprising at least one unique Uniform Resource Locator (URL);
    determining, by the processor, availability of the at least one U3I in a U3I repository coupled with the IIS;
    dynamically generating, by the processor, the requested U3I comprising the at least one unique URL without corresponding at least one redirect URL upon determining the non-availability of the requested U3I, wherein the at least one redirect URL is different from the at least one unique URL, wherein the at least one unique URL comprises a unique identifier comprising at least reserved bits and non-reserved bits, wherein the reserved bits comprises at least information of sender of the requested U3I comprising at least one unique URL and the non-reserved bits comprises randomly generated characters; and
    creating, by the processor, the at least one redirect URL comprising the infomercial content for the requested U3I.

2. The method as claimed in claim 1, wherein the at least one U3I comprising at least one unique URL is generated and stored in the U3I repository when the IIS is available for generation, wherein the at least one unique URL comprises at least one domain name of IIS.

3. The method as claimed in claim 1, wherein position of the reserved bits is variable within the unique identifier.

4. The method as claimed in claim 1, wherein the request for the at least one U3I comprising user data about at least one user receiving the at least one U3I, wherein the user data comprising at least user profile information, user device identifier, user device location information, user device navigation information and user preferences.

5. The method as claimed in claim 4, further comprising:
selecting the infomercial content from a content repository using the user data, wherein the content repository comprises the infomercial content related to multiple region, language, industry, and other related events; and
creating the at least one redirect URL comprising the selected infomercial content.

6. An interactive infomercial system (IIS) system, comprising:
a processor;
a data repository comprising unique infomercial identification information (U3I) repository and a content repository, coupled with the processor;
one or more user device associated with user, coupled with the processor; and
a memory communicatively coupled to the processor, wherein the memory stores processor-executable instructions, which, on execution, cause the processor to:
receive a request for at least one unique infomercial identification information (U3I) of infomercial content comprising at least one unique Uniform Resource Locator (URL);
determine availability of the at least one U3I in the U3I repository;
dynamically generate the requested U3I comprising the at least one unique URL without corresponding at least one redirect URL upon determining the non-availability of the requested U3I, wherein the at least one redirect URL is different from the at least one unique URL, wherein the at least one unique URL comprises a unique identifier comprising at least reserved bits and non-reserved bits, wherein the reserved bits comprises at least information of sender of the requested U3I comprising at least one unique URL and the non-reserved bits comprises randomly generated characters; and
create the at least one redirect URL comprising the infomercial content for the requested U3I.

7. The system as claimed in claim 6, wherein the at least one U3I comprising at least one unique URL is generated and stored in the U3I repository when the IIS is available for generation, wherein the at least one unique URL comprises at least one domain name of IIS.

8. The system as claimed in claim 6, wherein position of the reserved bits is variable within the unique identifier.

9. The system as claimed in claim 6, wherein the request for the at least one U3I comprising user data about at least one user receiving the at least one U3I, wherein the user data comprising at least user device identifier, user device location information, user device navigation information and user preferences.

10. The system as claimed in claim 9, wherein the processor is further configured to:
select the infomercial content from the content repository using the user data, wherein the content repository comprises the infomercial content related to multiple region, language, industry, and other related events; and
create the at least one redirect URL comprising the selected infomercial content.

11. A non-transitory computer readable medium including instructions stored thereon that when processed by at least one processor cause a test automation system to perform acts of:
receiving a request for at least one unique infomercial identification information (U3I) of infomercial content comprising at least one unique Uniform Resource Locator (URL);
determining availability of the at least one U3I in a U3I repository coupled with the IIS;
dynamically generating the requested U3I comprising the at least one unique URL without corresponding at least one redirect URL upon determining the non-availability of the requested U3I, wherein the at least one redirect URL is different from the at least one unique URL, wherein the at least one unique URL comprises a unique identifier comprising at least reserved bits and non-reserved bits, wherein the reserved bits comprises at least information of sender of the requested U3I comprising at least one unique URL and the non-reserved bits comprises randomly generated characters; and
creating the at least one redirect URL comprising the infomercial content for the requested U3I.

12. The medium as claimed in claim 11, wherein the at least one U3I comprising at least one unique URL is generated and stored in the U3I repository when the IIS is available for generation, wherein the at least one unique URL comprises at least one domain name of IIS.

13. The medium as claimed in claim 11, wherein position of the reserved bits is variable within the unique identifier.

14. The medium as claimed in claim 11, wherein the request for the at least one U3I comprising user data about at least one user receiving the at least one U3I, wherein the user data comprising at least user device identifier, user device location information, user device navigation information and user preferences.

15. The medium as claimed in claim 14, wherein the instructions stored thereon further causes the at least one processor to perform acts of:
selecting the infomercial content from a content repository using the user data, wherein the content repository comprises the infomercial content related to multiple region, language, industry, and other related events; and
creating the at least one redirect URL comprising the selected infomercial content.

* * * * *